UNITED STATES PATENT OFFICE.

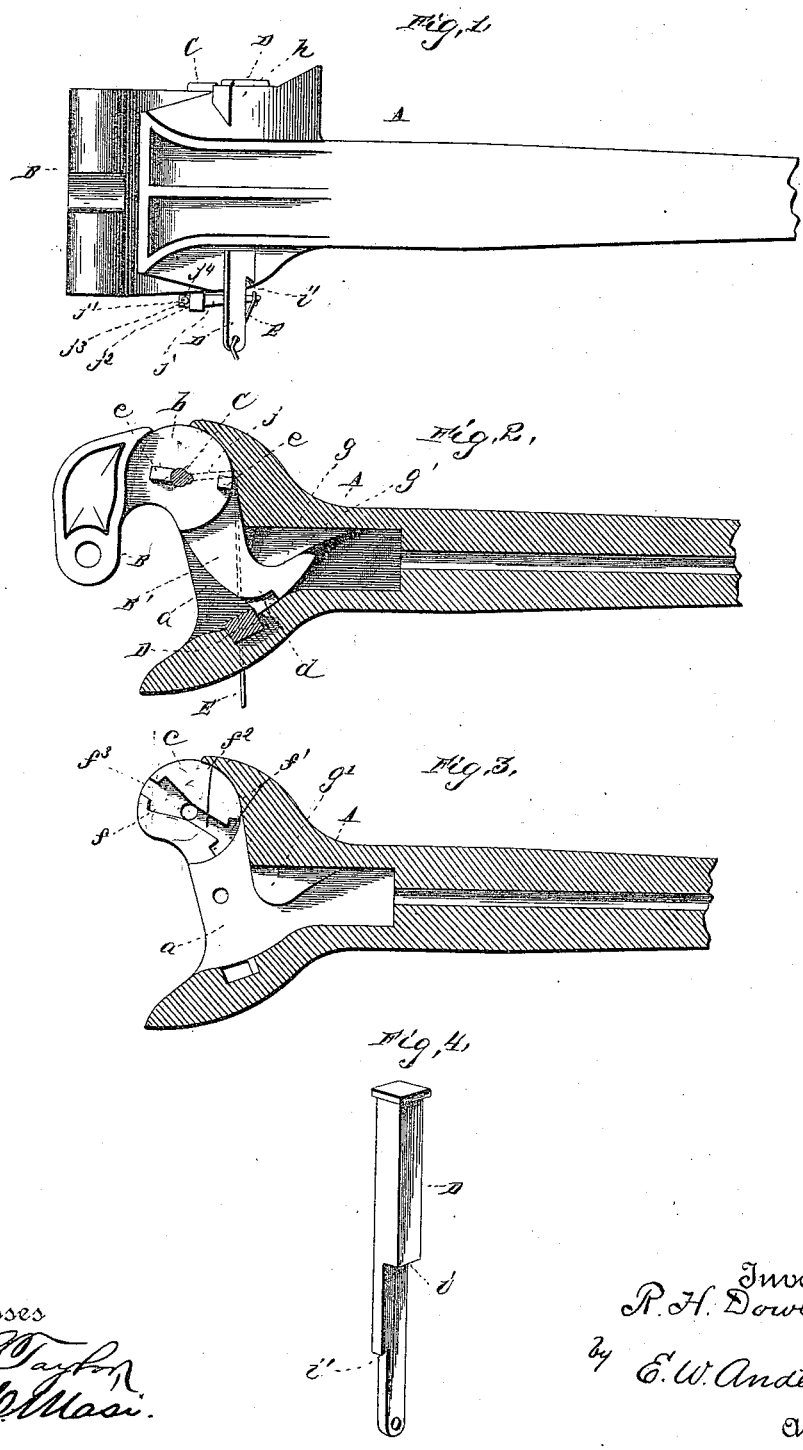

ROBERT H. DOWLING, OF NEWARK, OHIO, ASSIGNOR OF TWO-THIRDS TO CHARLES FOLLETT AND CHARLES H. FOLLETT, OF SAME PLACE.

CAR-COUPLING.

SPECIFICATION forming part of Letters Patent No. 442,574, dated December 9, 1890.

Application filed August 16, 1890. Serial No. 362,216. (No model.)

*To all whom it may concern:*

Be it known that I, ROBERT H. DOWLING, a citizen of the United States, and a resident of Newark, in the county of Licking and State of Ohio, have invented certain new and useful Improvements in Car-Couplings; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view. Fig. 2 is a horizontal section. Fig. 3 is also a horizontal section, and Fig. 4 is a detail view of the pin.

This invention relates to certain improvements in car-couplings; and it consists in the novel construction and combination of parts hereinafter disclosed.

In the embodiment of my invention I employ a draw-head A, preferably of the general outline herein shown and having the knuckle or hook receiving chamber $a$, and also employ the knuckle or hook B, having circular bosses or shoulders $b$ engaging corresponding seats or sockets $c$ in the rear corner portion of the chamber $a$ of the draw-head. The hook or knuckle B is pivoted in position by the axial pin C, passing therethrough and through the boss or shoulder-receiving seats or sockets $c$ in the draw-head, and has in the upper surface of its tongue B', at the forward corner edge or angle thereof, a recess or seat $d$, the purpose of which will appear farther on.

The bosses or shoulders $b$ of the hook or knuckle B are provided upon opposite sides of the pin-passage with lugs $e\ e$, engaging recesses or depressions $f\ f'$ in the seats or sockets $c$, connected together by passages or ways $f^2$, the outer recesses or depressions $f$ having entrance ways or passages $f^2$ to permit engagement therewith of the said lugs. This arrangement relieves the axial or pivoting pin C of strain that would otherwise be exerted thereon, while the shank or tongue B' of the hook or kuckle B has a reverse curved inner end $g$, with its re-entrant surface facing or bearing against a corresponding shoulder $g'$ at the inner rear edge of the chamber $a$ of the draw-head to receive the pulling strain.

D is the preferably-rectangular locking-pin engaging a corresponding opening or passage in the draw-head A and having its head in its lower position resting upon a boss or raised surface $h$ of the draw-head, said passage or opening intersecting the hook or knuckle chamber of the latter.

The pin D has about at its mid-length a shoulder $i$, facing the upper surface of the tongue or shank of the knuckle or hook B, and is adapted to engage the recess or seat $d$ of the latter, thus permitting the knuckle or hook to stand outward from the draw-head at slightly less than a right angle for coupling on sharp curves. The pin D has near its lower edge, at right angles to the shoulder $i$, a notch $i'$, engaging a recess or seat in the bottom edge of the draw-head A to hold the said pin entirely out of engagement with the knuckle or hook B.

E is a lever passing through the lower end of the locking-pin D and connected to an arm $j$, removably connected to the axial or pivoting pin C, it having an edgewise-arranged tenon-like projection $j'$ passing through a slot or aperture $j^2$ in the lower end of said axial or pivoting pin and having itself an aperture $j^3$, through which is inserted a pin or key $j^4$. This lever, with said arm $j$, permits the conjoint adjustment or movement of the locking-pin C and the knuckle or hook in effecting the coupling and uncoupling of the cars, thus avoiding a separate operation for that purpose, as heretofore practiced.

Having thus described this invention, what I claim, and desire to secure by Letters Patent, is—

1. The car-coupling having its draw-head provided with the circular sockets or seats, having at opposite sides of the passage for the knuckle or hook axial-pin recesses or depressions, one having outwardly flared or diverging walls and an entrance-way and the other having connection with the aforesaid depression by a passage-way, substantially as set forth.

2. The car-coupling having its draw-head provided with the circular sockets or seats, having recesses or depressions on opposite sides of the passage for the axial pin of the knuckle or hook, one having outwardly flared or diverging walls and an entrance-way and the other depression having connection with the aforesaid depression by a passage-way and being semicircular in shape, in combination with the knuckle or hook having the circular bosses or shoulders provided with lugs engaging said recesses or depressions, substantially as specified.

3. In a car-coupling, the knuckle or hook having the circular bosses or shoulders provided with lugs on opposite sides of the passage for the axial pin of said hook or knuckle, in combination with the draw-head provided with circular sockets or seats having recesses or depressions, one having flared walls and an entrance-way and the other depression having connection with the aforesaid depression by a passage-way and being semicircular in shape, substantially as set forth.

4. The combination, with the knuckle axial or pivoting pin, the locking-pin having the shoulder about at its mid-length and upon its forward edge or side, and the knuckle or hook having at its inner forward edge the seat or recess, of the lever passing through the lower end of the locking-pin and connected to an arm of the axial or pivoting pin, substantially as set forth.

In testimony whereof I affix my signature in presence of two witnesses.

ROBERT H. DOWLING.

Witnesses:
J. H. MILLAR,
T. O. DONOVAN.